Sept. 17, 1968  H. R. AMBERG ETAL  3,402,103

FERMENTATION OF CARBOHYDRATE-CONTAINING MATERIALS

Filed Jan. 27, 1965

INVENTORS.
HERMAN R. AMBERG
THOMAS R. ASPITARTE
JAMES F. CORMACK
JARRELL B. MUGG

BY
ATTORNEY

United States Patent Office 3,402,103
Patented Sept. 17, 1968

3,402,103
FERMENTATION OF CARBOHYDRATE-
CONTAINING MATERIALS
Herman R. Amberg, Thomas R. Aspitarte, and James F. Cormack, Camas, and Jarrell B. Mugg, Vancouver, Wash., assignors to Crown Zellerbach Corporation, San Francisco, Calif., a corporation of Nevada
Filed Jan. 27, 1965, Ser. No. 428,326
6 Claims. (Cl. 195—32)

ABSTRACT OF THE DISCLOSURE

Spaced packing surfaces are disposed vertically in a tower, and fermenting organisms are grown on the packing surfaces. Thin films of carbohydrate-containing liquor are flowed substantially vertically downwardly without substantial change of direction over the organism surface so that the residence time of the feed liquor in the tower is less than 30 minutes. Substantial conversion of carbohydrate to fermentation product is achieved in one pass without recycling the liquor.

---

This invention relates to a process for continuous fermentation of a carbohydrate-containing liquor to produce a fermented liquor.

The fermentation of carbohydrate-containing liquors to produce a fermentation product, such as alcohol, has been accomplished historically in large vats in which a culture of fermenting organisms and the liquor are held for a period of one day or more. More recently it has been found that by passing the liquor and organisms through a series of connected tanks or through towers filled with various packings the time required for the fermentation to be completed is reduced to 12–18 hours and in one instance, to about 7 hours. The culture of the fermenting organisms is grown on the packing which contains voids for the liquor to pass through. However, the voids in these packings are noncontinuous, such as those created by Raschig rings, and become clogged by an excess growth of the organisms which increases the time required for the fermentation to many hours and reduces the efficiency of the process appreciably.

We have now discovered that the use of certain packing arrangements in a packed tower fermentor unexpectedly permits reduction of the fermentation time to less than 30 minutes, thereby greatly increasing the efficiency of the process. We have also discovered that the packing arrangement employed in the process for our invention permits production of fermenting organisms substantially in an aggregate form, such as a mycelial form, which can be separated from the effluent fermented liquor by simpler and less costly equipment than that required by previous fermentation processes which yield small unicellular fermenting organisms removable only by costly centrifugation. The particular packing arrangement which we have employed in the method of our invention comprises packing surfaces forming void spaces which are generally vertical and extend continuously down from the top of the packing to the bottom thereof.

Accordingly, the object of the present invention is a fermentation process which greatly reduces the fermentation time of a carbohydrate-containing liquor and produces a fermentation product in high yield.

Another object of the present invention is a fermentation process which produces organisms which are substantially in an aggregate form.

Other objects of this invention are apparent from the following description and appended drawings.

The design of the packing in the packed tower fermentor in the process of the present invention is important and comprises a packing which has continuous void spaces in the form of channels which are generally, preferably substantial vertical and extend continuously down from the top of the packing to the bottom thereof. Examples of such channels are straight or corrugated vertical or tilted tubes having a suitable horizontal cross-sectional area, such as a circular or rectangular shape.

Figure 1:
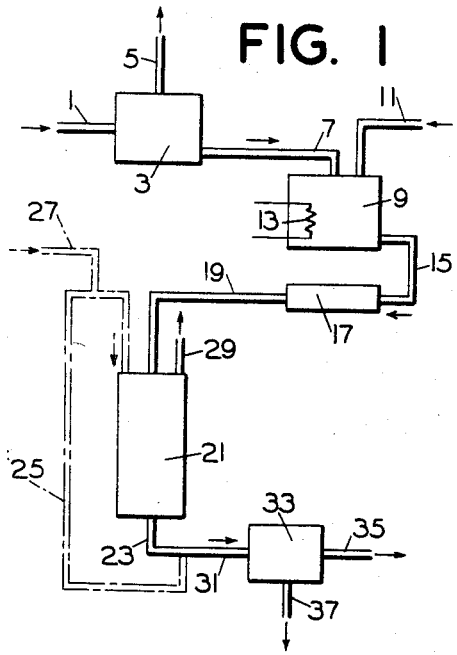
Figure 2:
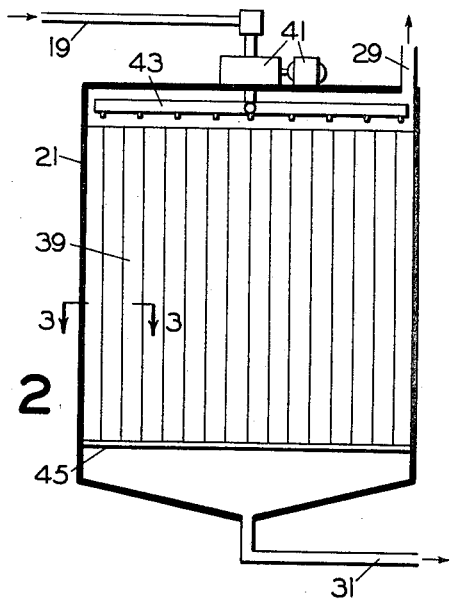
Figure 3:
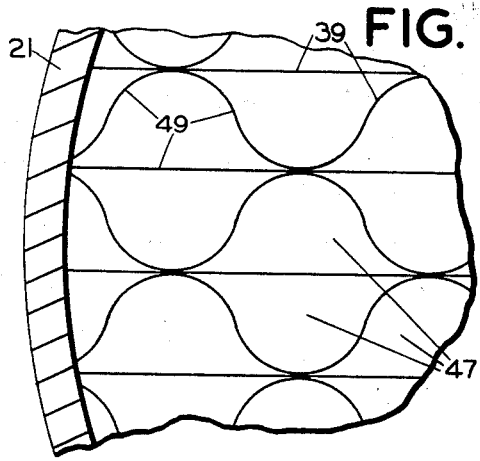
Figure 4:
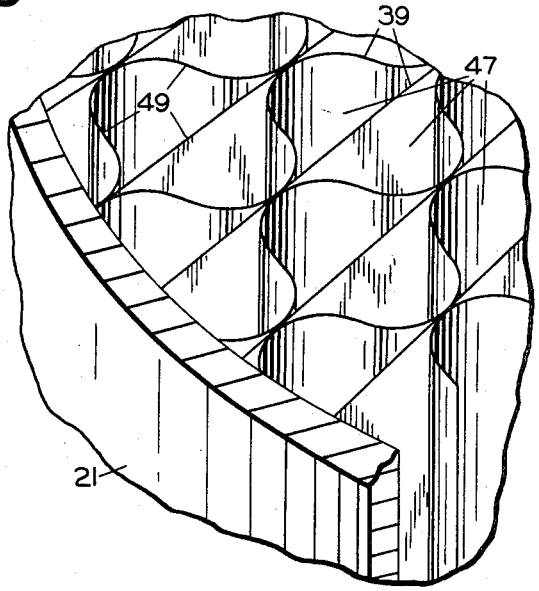
Figure 5:
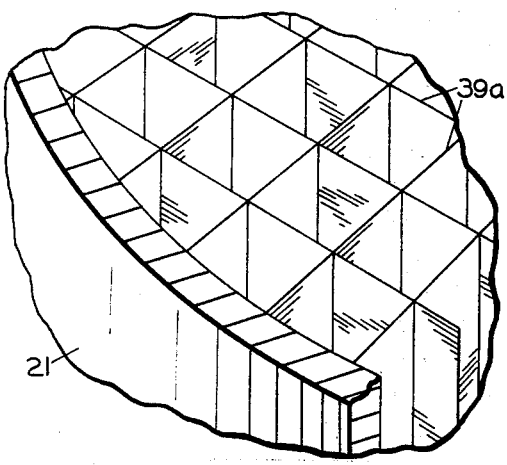

Referring to the drawings which illustrate a specific embodiment of the present invention, FIGURE 1 shows a flow diagram of the process of our invention. FIGURE 2 illustrates a front cross-sectional view of packed fermentor 21; FIGURE 3 shows the top view and FIGURE 4 shows the perspective view of a typical portion of packing 39 along line 3—3 in FIGURE 2. FIGURE 5 depicts a perspective view of a typical portion of another type of packing arrangement 39a which may be employed in the process of our invention.

As shown in FIGURE 1, a dilute carbohydrate-containing liquor 1 is fed into evaporator 3 to evaporate water to concentrate the liquor. However, when a concentrated liquor is used the evaporation thereof is not necessary. Vapors are let out of evaporator 3 through line 5. Concentrated liquor is discharged through line 7 into feed preparation tank 9. The carbohydrate-containing liquor may or may not contain any nutrient for the growth of the organisms on the packing surfaces 49. Line 11 supplies a sufficient amount of nutrient into tank 9 to be mixed with the carbohydrate-containing liquor in tank 9. Heater 13 keeps the temperature in tank 9 at about 55° C. or higher to inhibit activity of undesirable organisms. Feed liquor 15 containing nutrient 11 and carbohydrate-containing liquor 1 is discharged from tank 9 and is cooled in heat exchanger 17 to a desirable fermentation temperature and is sprayed on the packing of cylindrical fermentor 21 through line 19 and distributor 43. Distributor 43 is rotated by drive 41 and has a plurality of spray nozzles to evenly distribute the feed liquor on the packing.

Fermentor 21 is prepared for operation by sterilizing it with, for instance, a formaldehyde solution recycled through the fermentor for a sufficient time to eliminate any undesirable organisms. To start the fermentation reaction, a film of the fermenting organisms on packing surfaces 49 is formed by recycling feed liquor 19 in tower 21 through lines 23 and 25 and adding fermenting organisms through line 27 to the recycle line 25. The fermenting organisms may be also added to feed liquor 19. After the film is formed on packing surfaces 49, feed recycle 25 and organism supply 27 are no longer necessary and the fermentation reaction starts in tower 21 as a thin film of feed liquor 19 flows down over the organism film. The contact of the feed liquor film and the organism film causes the fermentation reaction and produces the fermentation products. The nutrient in the feed liquor aids growth and propagation of the fermenting organisms which are substantially in the aggregated form. The excess growth of such organisms is sloughed-off from the organism film by its own weight and falls down through the void spaces 47 of packing 39 and is discharged with the fermented liquor. The fermented liquor containing the fermentation products including the excess growth of organism is discharged through line 31 into a clarifier 33, such as a moving wire screen to separate clumps of the aggregated organism product through line 37 from the fermented liquor. The remaining fermentation products are discharged through line 35 to a refinery for purification of the desired fermentation product by conventional means, such as distillation.

The fermentor employed in the process of this invention is a vessel of a desired shape, such as cylindrical, rectangular, or polygonal, which is filled with a special type of packing. Materials employed for the packing may vary. However, any material which is compatible with the carbohydrate-containing liquors, the fermented liquors, and the process conditions of the present invention is suitable. Exemplary of the packing materials are polyvinyl chloride, polyethylene, wood, concrete, stainless steel, and fabric in the form of rigid sheets oriented vertically and inter-connected in such a way that void spaces are formed which are substantially vertical and continuous throughout the length of the packing. The packing surfaces may be smooth or relatively rough since the organisms adhere to both types of surface finish of different packing materials. However, for an optimum adherence of the organisms, a very slight roughness of the packing surfaces is preferred. The height of the packing may vary, however, a height of between 10 and 30 feet is preferred.

The packing throughout its height may be of the same design and arrangement such as that shown in FIGURE 4 or 5, or it may comprise a combination of different designs and arrangements. For instance, the upper half of the packing may be of the type shown in FIGURE 4 and lower half thereof of the type shown in FIGURE 5 or of the type shown in FIGURE 4 rotated about 90° around its vertical axis. A preferred packing is of the type shown in FIGURE 4 arranged so that about every two-foot section of the height thereof is alternately rotated about 90° around its vertical axis. The preferred packing arrangement prevents the free fall of portions of the feed liquor through the void spaces without sufficient contact with the organism film and permits maximum distribution of the feed liquor over the packing surfaces. In any event, regardless of the packing designs and arrangement, it is desirable to maintain the configuration of the void spaces as generally vertical and extending continuously down from the top of the packing to the bottom thereof with cross-sectional areas as described hereinbelow. It is clear from the drawings and the above description that due to the vertically downward slope of the packing surfaces, the feed liquor, after emerging from the distributor 43, will flow continuously downward in a moving film having a substantially uninterrupted flow path over the organism film between the top and bottom of the tower.

The void spaces have sufficiently large horizontal cross-sectional areas so that excess growth of organisms on their surface does not plug the continuous channels created by the void spaces. Channels which have small cross-sectional areas are not suitable since excess growth of the fermenting organisms on the packing surfaces clogs the channels. Plugged up void spaces greatly interfere with the fermentation process and the flow of carbohydrate-containing liquor, reduce the product yield appreciably, and increase fermentation time substantially. Cross-sectional areas which are too large require an unnecessary high packing volume which results in an expensive process. A desirable cross-sectional area for each channel is at least 1 inch square, preferably between about 1 and about 3 square inches.

In order to prepare the packed tower for fermentation operation, it is desirable to first treat the packing surfaces by forming a film of the fermenting organisms thereon. To accomplish this purpose, a feed liquor and a fermenting organism are admixed and are fed through the packing, preferably circulated therethrough in a closed system, for a sufficient time to allow the organisms to grow and form a film substantially adhering on the packing surfaces. The organisms feeding on the carbohydrate portion of the feed liquor gradually grow and propagate on the packing surfaces and form a film thereon. If the carbohydrate-containing material does not contain a sufficient amount of nutrients for the organisms, a nutrient is admixed with carbohydrate-containing liquor. Exemplary of such nutrients are materials which yield nitrogen, phosphorus, and potassium. The nutrient materials may be potassium chloride, urea, ammonium phosphate or the like. The organism film is formed in the presence of at least traces of oxygen, such as that which is contained in trapped air in the packed tower. For this reason, generally additional supply of oxygen to the tower is not necessary.

Once the initial step of preparing the packed surfaces for the fermentation process is completed, the fermentation of a carbohydrate-containing liquor is started by spraying the feed liquor onto the top of the packing so that it is distributed over the packing surfaces at a rate sufficient to form a thin film of trickling liquor over the organism film. After the organism film is formed on the packing surfaces, further addition of the organism onto the packing and the recycle of the feed liquor therethrough are no longer necessary and the fermentation reaction takes place anaerobically in substantial absence of air or oxygen.

The trickling of the liquor over the organism film can be accomplished at different rates, however, a laminar flow is desirable. Generally a flow rate of between about 0.1 and about 5, preferably between 0.5 and 3, gallons per square foot of the packing surfaces per day is satisfactory. The flow of the feed liquor film over the organism film and the continuous contact therebetween not only perpetuates the fermenting organism film but also causes growth and propagation of an excess amount thereof. For these reasons, it is not necessary to supply and circulate fermenting organisms after the organism film is formed and adhered to the packing surfaces. The void spaces have sufficient cross-sectional areas to prevent plugging of the channels in the packing due to sloughed-off excess growth of the organisms. The excess growth of the organisms freely falls off the organism film by its own weight and is discharged from the fermentor with the fermented liquor product. It is desirable to form as thin a film of the feed liquor as possible since the thinner the film the more is the contact between the feed liquor and the organisms and, therefore, the higher is the efficiency of the fermentation. The elimination of the plugging of the channels permits continual maintenance of the thin liquor film, thereby resulting in the short fermentation time and the high yield of the fermentation products of the process of this invention.

The fermentation temperature may vary depending on the type of organism used and the fermentation product desired. However, generally, a temperature of between about 5° C. and about 50° C. is sufficient. For instance, when yeast is employed to produce ethanol, the temperature is between 5° C. and 35° C., preferably between 28° C. and 32° C.; when bacteria are used to produce butyl alcohol, the temperature is between 20° C. and 45° C., preferably between 37° and 42° C.; and when *Lactobacillus bulgaricus* is used to produce lactic acid the preferred temperature is between 45° and 50° C.

The pH of the feed liquor generally varies between 3.5 and 7.5 depending on the fermentation products desired and organisms used. For instance, for ethanol production a pH of between about 4 and 5.5 is preferred and for production of butyl alcohol a pH of between about 5 and about 7 is preferred.

The fermentation time, i.e., the residence time required for the feed liquor to contact the organism film on the packing surfaces and be discharged from the fermentor as a fermented liquor, is extremely short and mainly depends on the height of the packing surfaces. For instance, with a packing height of between 20 and 30 feet the residence time is about 5 to 8 minutes and a substantial conversion of the carbohydrate into fermentation product is obtained. Viscosity of the feed liquor effects the fermentation time to a minor extent and the higher the viscosity the longer is the time. However, if the feed liquor is too viscous, it interferes with the free flow thereof. The upper limit of the viscosity can be easily determined by one having ordinary skill in the art.

The carbohydrate-containing liquor may be any fermentable material. Such liquor may be derived from saccharine materials, such as sugar cane, sucrose, mannose, fructose, glucose, sugar beets, molasses, and fruit juices; starchy materials which can be hydrolyzed to fermentable sugars by biological or chemical means, such as cereals, corn, malt, barley, oats, rye, wheat, rice, grain, sorghum, potatoes, sweet potatoes, Jerusalem artichokes (girasol), manioca meal; cellulosic materials, such as spent sulfite liquor from a sulfite pulp mill, wood hydrolyzates; and whey.

The choice of the fermenting organisms depends on the type of the product to be obtained. For instance, a yeast, such as *Saccharomyces cerevisiae* or *Candida utilis* may be used to produce ethanol; *Clostridium acetobutylicum* may be used to produce acetone and butanol; and *Lactobacillus casei* may be employed for production of lactic acid. The fermenting organisms are also of the type that adhere to the packing surfaces to make a film.

The growth and propagation of the fermenting organisms in the process of present invention is substantially in aggregate form. These aggregations, such as those formed by yeast, bacteria, or fungi, are large in size and easily removed from the fermented liquor by a clarifier which is inexpensive and commercially practical. This is another advantage over the methods of fermentation disclosed heretofore which employ towers packed with packings, such as Raschig rings and produce fermenting organisms which due to noncontinuous and tortuous paths through the packing are discharged from the tower as unicellular organisms which cannot be separated from the fermented liquor by a clarifier and require expensive centrifugation equipment.

The fermented liquor containing the fermentation products, such as ethanol and the excess growth of the organisms is discharged from the fermentor into a clarifier to separate the organism aggregates from the fermented liquor. The remaining products are discharged to a recovery plant where the desired fermentation product is purified by conventional means, such as distillation.

Recycling of the fermented liquor containing the excess growth of the organism, is not required for the practice of the present invention. This is due to the fact that sufficient organisms are grown on and adhere to the packing surfaces so that a continuous supply thereof through recycling of the fermentation products is not necessary. However, if desired, a part of the fermented liquor from which the organism aggregates have been separated may be recycled to the packing surfaces for complete conversion and fermentation of traces of unfermented carbohydrate. It is preferred to use a concentrated carbohydrate-containing liquor since a higher yield of fermented products is obtained than that produced from a dilute carbohydrate-containing liquor and also a smaller volume of the packing arrangement is required. The more concentrated the carbohydrate-containing material the better the results obtained. Generally, a concentration of up to 35 g. of carbohydrates per 100 ml. of the feed liquor is satisfactory. For instance, for spent sulfite liquor 4 to 6 g. and for molasses 10 to 18 g. of carbohydrate per 100 ml. of the liquor is preferred. In case of dilute liquors, some recycling of the organism-free fermented liquor is preferred since it results in higher conversion of the carbohydrate and reduces the volume of the packing otherwise required and thus renders the process less expensive.

The following examples illustrate but do not limit the scope of the present invention:

*Example 1.—Production of ethanol from concentrated spent sulfite liquor*

A concentrated spent sulfite liquor is fermented to produce ethanol and yeast in a packed tower. The concentration of the sulfite liquor as received from a pulp mill is 10 g. of solids per 100 ml. of the liquor and has a pH of 2.8 due to its residual $SO_2$ content. About 20% of the spent sulfite liquor solids is a mixture of carbohydrates including glucose and mannose. The spent sulfite liquor is concentrated to 20 g. of solids per 100 ml. of the liquor in an evaporator which also removes the sulfur dioxide content of the feed liquor, thereby preventing the inhibition of the fermentation. A solution of a nutrient mixture containing potassium chloride, urea, and ammonium phosphate is added to the sulfite liquor to obtain a normal feed liquor. After the nutrient addition, the normal feed liquor contains 0.7 pound nitrogen, 0.2 pound phosphorus in the form of $P_2O_5$, and 0.16 pound potassium per ton of the solids. A sodium hydroxide solution is also added to bring the pH of the normal feed liquor to 5.0. The feed liquor is kept in a tank at 60° C. to prevent growth of undesired organisms. A two-unit fermentor is used which consists of two 32-foot diameter wooden tanks packed to a depth of 20 feet. The packing is of the type shown in FIGURES 3 and 4 and is made of vertically oriented sheets or rigid polyvinyl chloride interconnected in such a way that void spaces are formed which are vertical and continuous throughout the height of the packing. Each void space in the packing has a horizontal cross-sectional area of about 2 square inches. The packing is so arranged that every two-foot section of the height thereof is alternately rotated 90° around its vertical axis resulting in void spaces having different horizontal cross-section areas ranging between 1 and 2 square inches. The total packing surface area is 463,000 square feet. The fermentor is prepared for operation by first being sterilized with a formaldehyde solution which is recycled through the fermentor for 3 days. Following the sterilization, in order to form a thin organism film on the packing surfaces, the feed liquor is modified to contain a slurry of *Saccharomyces cervisiae* and 10 times the amount of nutrient stated hereinabove. The modified feed liquor is cooled to 32° C. and sprayed over the packing and recycled through the tower for three days. After every 4 hours a fresh modified feed liquor is added to the tower amounting to 15% of the total volume of the feed liquor in the system. This procedure results in the formation of a thin organism film on the packing surfaces. During the formation of the organism film sterilized air is added to the tower to enhance the growth of the organism. Once the organism film is formed the supply of the air, additional nutrient, and organism are stopped and continuous feeding of the normal feed liquor is started substantially in the absence of air or oxygen without recycling the products. To introduce the normal feed liquor to the tower it is sprayed over the top of the packing uniformly at a rate of 309 gallons per minute by a rotating spray header. The rate of flow of the normal feed liquor on the packing surfaces of 0.96 gallon per square foot of packing surface per day. The flow of the liquor is adjusted so that a flowing film of the feed liquor having a thickness of about 0.2 mm. is formed over the organism film. The close contact of the liquor with the organisms on the packing surfaces results in the fermentation of the feed liquor and produces ethanol as well as an excess growth of aggregated mycelial organisms which is sloughed-off the organism film and is discharged with the fermented liquor. The fermentation time, i.e., the residence time, is 7 minutes and the yield is 18.1 gallons per ton of the sulfite liquor solids corresponding to a yield of 91.5%. The fermented liquor containing the mycelial yeast is pumped to a moving side hill screen to remove clumps of the mycelial yeast. The remainder of the fermented liquor is pumped to a refinery to recover the ethanol. The mycelial yeast product represents about 4% of the carbohydrate by weight.

*Example 2.—Production of ethanol from dilute spent sulfite liquor*

The procedure of Example 1 is repeated except as follows: A dilute spent sulfite liquor containing 10 g. of solids per 100 ml. is employed and the sulfur dioxide is removed from it by a stripping column. The height of the fermentor is 30 feet and contains 621,600 square feet of the packing surface in a single unit and operates with a recycle system. The rate of flow of the normal feed liquor down each void space is 1.4 gallons per square foot of packing surfaces per day based on one pass, however, with a recycle ratio of 1.0, the rate is 2.8 gallons per square foot per day. The yeast product is separated from the fermented liquor and a portion of the fermented liquor product is recycled. The ethanol product is 17.3 gallons per ton of the sulfite liquor solids corresponding to a yield of 87.3%. The mycelial yeast product represents 4% of the carbohydrate by weight.

From the foregoing description and the appended drawings it is apparent that we have discovered a method of fermenting a carbohydrate-containing liquor to produce a fermentation product, such as ethanol, inexpensively, efficiently, and in high yield. Our process permits carbohydrate-containing liquors to be fermented in a much shorter time than any method previously described and allows much smaller and less costly equipment to be used. Furthermore, our process also produces substantially large organism aggregates which can be easily separated from the fermented liquor and recovered, if desired, using simpler and less costly equipment than the expensive centrifugation equipment needed by conventional processes due to a substantial amount of small unicellular organisms produced. The organism aggregates can be used as fermenting organisms, food, fodder, or as a source for pharmaceutical products, such as vitamins.

What we claim is:

1. A process of anaerobically fermenting a carbohydrate-containing liquor to produce a fermented liquor, said process comprising:
    (a) forming a film of anaerobic fermenting organisms on surfaces defining a plurality of substantially vertically disposed channels;
    (b) passing said carbohydrate-containing liquor vertically downward without substantial change of direction through said channels as a substantially uninterrupted laminar flow film substantially in the absence of oxygen and in intimate contact with said organism film for a sufficient time to ferment said liquor; and
    (c) discharging the fermented liquor from said channels.

2. The process of claim 1 wherein the residence of said feed liquor on said organism film is for a period of time less than thirty minutes.

3. A process of anaerobic fermentation of a carbohydrate-containing liquor to produce a fermented liquor containing fermenting aggregated organisms comprising:
    (a) employing a packed tower containing packing surfaces forming continuous and generally vertical void spaces extending down from the top of the packing to the bottom thereof, the packing surfaces being for adherence and growth of the fermenting organisms, each void space having a sufficient horizontal cross-sectional area so that the plugging thereof by sloughed-off excess growth of the organisms is avoided;
    (b) growing the fermenting organisms on the packing surfaces so that an organism film is formed on the surfaces;
    (c) spraying a feed liquor onto the packing and flowing the sprayed feed liquor substantially in the absence of oxygen as thin films moving vertically downward on the packing in substantially uninterrupted flow paths without substantial change of direction between the top and bottom of the tower, the liquor flowing at a sufficient rate and temperature whereby a fermentation reaction occurs producing the fermented liquor while an excess growth of the aggregated organism is formed on the organism film;
    (d) allowing the excess growth of the organisms to slough-off and fall down through the void spaces of the packing; and
    (e) discharging the fermented liquor containing the excess growth of the organisms.

4. The process of claim 3, wherein the fermenting organisms are grown on the packing surfaces by circulating the fermenting organisms in admixture with the carbohydrate-containing liquor and a nutrient for a sufficient time and at a sufficient rate to form an organism film adhering on the packing surfaces.

5. The process of claim 4, wherein a further step includes separating the excess growth of organisms from the fermented liquor.

6. The process of claim 5, wherein the carbohydrate-containing liquor is spent sulfite liquor, and the produced fermented liquor is ethanol.

References Cited

UNITED STATES PATENTS 3,210,196   10/1965   Corran et al. _____ 195—49

FOREIGN PATENTS 469,300   7/1937   Great Britain.
937,597   9/1963   Great Britain.

LIONEL M. SHAPIRO, *Primary Examiner.*